May 8, 1962     J. M. ALGINO     3,032,888
DRIER CONTROL SYSTEM
Filed June 2, 1958
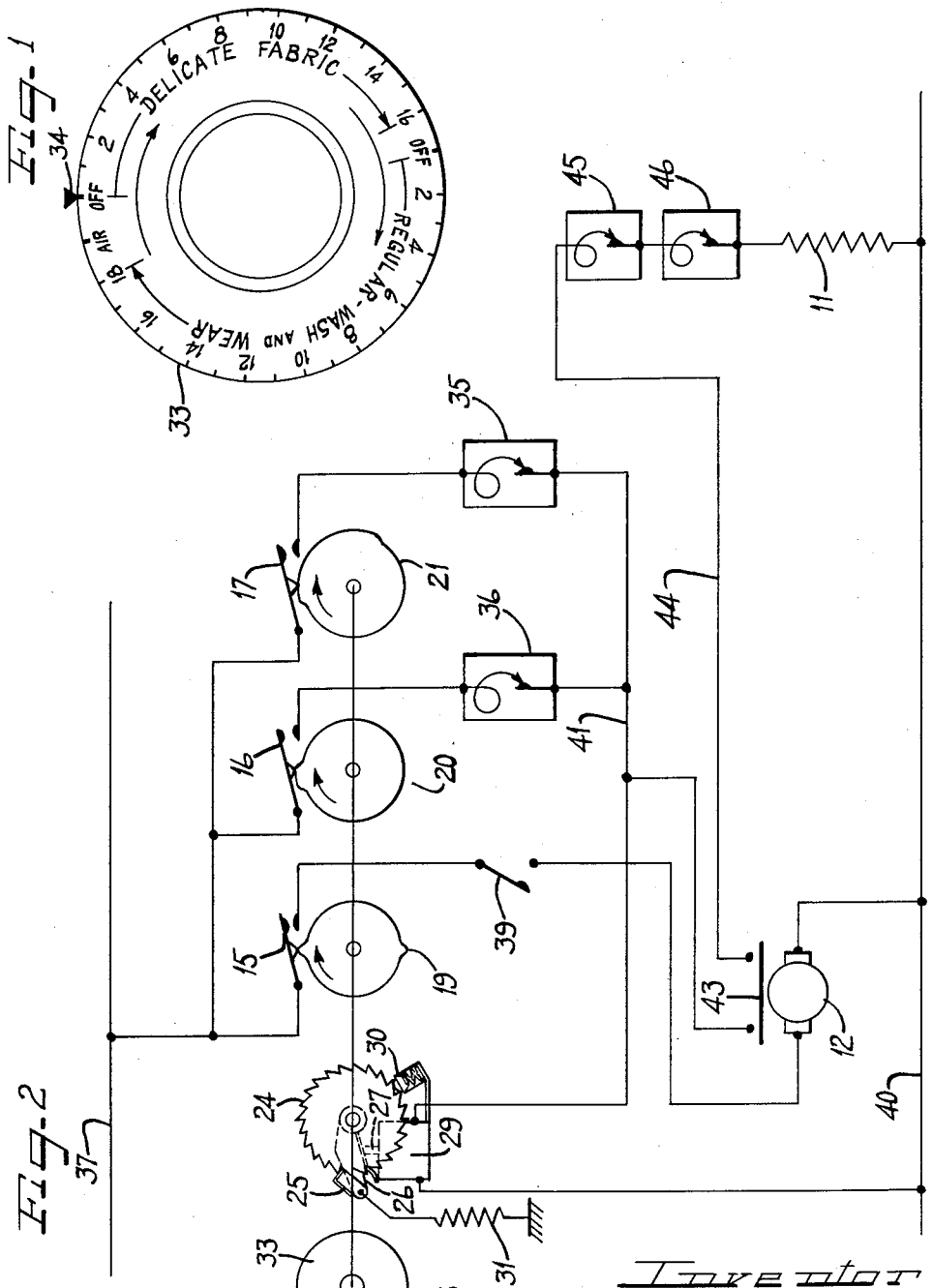
Inventor
Joseph M. Algino
by Hill Sherman Meroni Gross & Simpson
Attys _United States Patent Office_

3,032,888
Patented May 8, 1962

3,032,888
DRIER CONTROL SYSTEM
Joseph M. Algino, Chicago, Ill., assignor to The Dole Valve Company, Morton Grove, Ill., a corporation of Illinois
Filed June 2, 1958, Ser. No. 739,325
3 Claims. (Cl. 34—45)

This invention relates to improvements in clothes driers and more particularly relates to an improved control circuit therefor.

A principal object of the invention is to improve upon the controls for the drying of clothes in a clothes drier, by controlling the drying operation entirely by the condition of the clothes being dried.

A further object of the invention is to improve upon the drying of clothes by controlling the drying operation in accordance with the condition of the clothes, rather than by time, in which the control is cycled toward an off position under the control of a thermostat effecting an advance of the control system for one cycle each time a predetermined amount of moisture is removed from the clothes.

A still further object of the invention is to control the drying of clothes by a series of cycling operations effecting a cycling step each time a predetermined amount of moisture is removed from the clothes being dried, wherein the cycling steps are controlled by two thermostats of different temperature characteristics, the high temperature thermostat effecting a cycling step each time sufficient moisture is removed from the clothes to open the thermostat and the temperature drops to effect closing of the thermostat and the low temperature thermostat controlling the cooling of the clothes and terminating the drying operation.

A still further object of the invention is to simplify the drier control systems heretofore in common use by replacing the timer, relay and heat selector switch formerly used by an impulse cycler, and by controlling cycling of the impulse cycler by the condition of the clothes being dried.

These and other objects of the invention will appear from time to time as the following specification proceeds and with reference to the accompanying drawing wherein:

FIGURE 1 is a schematic wiring diagram of a cycling drier control circuit constructed in accordance with the invention; and FIGURE 2 is a plan view of the dial knob for setting the cycler for the required cycles for the particular type of fabric to be dried.

In the embodiment of the invention illustrated in the drawing, a control circuit is shown for controlling operation of a heating unit 11, particularly adapted to heat the air circulated over the clothes by the usual blower (not shown) driven by a motor 12, which may also tumble the clothes in a drier drum (not shown), as heated air is circulated over the clothes in a manner well known to those skilled in the art, so not herein shown or described further.

In order to simplify the disclosure and avoid obscuring the invention, the heater unit is shown for illustrative purposes as being an electric heater, although it may be a gas burner ignited by the usual electric igniter and supplied by gas under the control of the usual solenoid control valves. Where the heater is a gas burner the control circuit may control the cycling of the main gas valve, in the same manner the electric heater unit may be cycled as moisture is removed from clothes tumbled in the tumbling drum.

The drier control circuit controlling the energization of the heater unit 11 and the motor 12 is shown as including three cycling switches 15, 16 and 17 operated by cams 19, 20 and 21 respectively, of an impulse cycler 23.

The impulse cycler 23 may be of any well known form and is herein shown as including a ratchet wheel 24 operated by a pawl 25 on a rockable carrier 26. The carrier 26 is biased into engagement with an armature 27 of a solenoid coil 29, to advance the cycler one step, or a distance equal to the space between two teeth of the ratchet wheel, each time the magnet coil 29 is energized.

A detent 30 is shown as being provided to index the cycler and to hold the ratchet wheel 24 in position as the magnet coil 29 is deenergized. A spring 31 returns the pawl 25 into position to engage a next succeeding tooth of the ratchet wheel 24 upon deenergization of the magnet coil.

A dial knob 33 is provided to set the impulse cycler to the required number of cycles for drying the particular types of articles to be dried during a drying operation. As for example, when drying regular fabrics, the dial knob 33 may be moved from an off position to a position where numeral 18 registers with an indicia arrow 34, indicating that 18 cycles of operation of the impulse cycler are required for drying the clothes, the length of the cycles being determined by the condition or amount of moisture removed from the clothes under the control of a high temperature fixed thermostat 35. Under this setting the shutting off of the system is controlled under the control of a low temperature fixed thermostat 36, as will hereinafter more clearly appear as this specification proceeds. Upon turning of the dial knob 33 to an operating position for regular drying, the cams 19, 20 and 21 will be moved in position to close the three switches 15, 16 and 17.

Upon closing of the switch 15, a circuit will be completed from a main line conductor 37 through the cycler switch 15 to a door switch 39. As the door of the drier is closed, an energizing circuit to the motor 12 will be completed through the motor 12 to a main line conductor 40. The motor 12 will then start to drive the drier drum (not shown) to tumble clothes therein and to drive the blower (not shown) to circulate air over the heater unit and through the tumbling clothes in the drier drum.

As the cycler switches 16 and 17 are closed, an energizing circuit will be completed from the main line conductor 37 through the high temperature thermostat 35 and the low temperature thermostat 36 to and through a conductor 41. The conductor 41 is shown as being connected with the heater unit 11 to energize said heater unit through a centrifugal switch 43 for the blower motor 12. The centrifugal switch 43 closes as the motor 12 comes up to speed. The closing of the centrifugal switch 43 will complete a circuit through a conductor 44 and through safety thermostats 45 and 46 and through the heater unit 11 to the main line conductor 40.

The safety thermostat 45 and 46 are of a type commonly used in clothes driers to deenergize the heater unit upon excessive temperature conditions. One such thermostat may be located in the heater box of the drier (not shown) while the other thermostat may be located in the fan scroll (not shown). The safety thermostats 45 and 46 and the locations thereof are no part of the present invention so need not herein be shown or described further.

A circuit will also be completed through the conductor 41 to and through the solenoid coil 29 to the conductor 40, to energize said solenoid coil and to effect extensible movement of the armature 27 to advance the impulse cycler a distance equal to the length of one tooth of the ratchet wheel 24. As the drier temperature rises to a predetermined temperature the low temperature thermostat 36 will open. Drying will then be carried out under the control of the high temperature thermostat 35.

Thus, upon the setting of the dial knob 33 to a position for regular wash and the closing of the switches 15, 16 and 17 and the closing of the door switch 39 by closing the door (not shown) of the drier, the motor 12 will start. The solenoid coil 29 will also be energized to advance the impulse cycler 23 a distance equal to the length of one tooth of the ratchet wheel 24. When the motor 12 comes up to speed, a circuit will also be completed to the heater until 11 to energize said heater unit through the centrifugal switch 43 and the safety thermostats 45 and 46.

The high temperature thermostat 35 may be of a type which is normally closed in which the contacts may, for example, open at a temperature of 175° and which may close at a temperature of 150°.

The low temperature thermostat 36 may be of a type in which the contacts, for example, are normally closed and open at a temperature of 135° and close at a temperature 115°.

Thus, when the dial knob 33 is turned to the "on" position for the required cycles for the articles of clothes to be dried and the motor 12 comes up to speed, a circuit will be completed through the low temperature thermostat 36 and the high temperature thermostat 35. As, however, the temperature in the drier drum reaches 135°, the low temperature thermostat 36 will open and drying will be entirely under the control of the high temperature thermostat 35. The switch 16, however, will remain closed during the entire drying operation and until the end of cycling of the impulse cycler 23.

During operation of the drier, as sufficient moisture has been removed from the clothes to cause a temperature rise within the drier drum to 175°, the thermostat 35 will open. This will deenergize the solenoid coil 29 and will also deenergize the heater unit 11. The motor 12 will, however, continue to operate, being energized through the impulse cycler switch 15 and the door switch 39. As the temperature within the drier drum drops to 150°, the high temperature thermostat 35 will then close. This will energize the solenoid coil 29 and effect the advance of the ratchet wheel 24 a distance equal to the length of one tooth thereof. It will also advance the timer cams 19, 20 and 21 a corresponding amount. Closing of the high temperature thermostat 35 will also energize the heater unit 11 to effect the circulation of heated air over the tumbling clothes until sufficient moisture has been removed from the clothes to again cause a temperature rise within the drier drum to 175°, at which time the high temperature thermostat 35 will open, the solenoid coil 29 will be deenergized and the heater unit 11 will also be deenergized. The circulation of heated air over the heater unit and through the tumbling clothes will be continued until the temperature again drops to 150°, at which time the heater unit will again be energized and the impulse cycler will advance another cycle equal to the length of a tooth of the ratchet wheel 24.

The foregoing cycling operations will thus continue until all but the last cycle has been carried out, at which time all of the moisture will be removed from the tumbling clothes. The cam 21 will then open the switch 17, cutting the high temperature thermostat 35 out of the circuit. The control will then be shifted to the low temperature thermostat 36.

As the low temperature thermostat 36 takes over the control of the drying operation and the drier has cooled down to 115°, the low temperature thermostat 36 will close. The solenoid coil 29 will then be energized. This will advance the cycler one step. The switches 15 and 16 will then open and deenergize the heater 11 and motor 12. The blower (not shown) and the drier drum (not shown) may then coast to a stop. The drier door (not shown) may then be opened to accommodate the removal of clothes from the drier drum, which have cooled to the extent that they may readily be removed by hand.

Where delicate fabrics are to be dried, the dial knob 33 may be turned to a position, for example, where the delicate fabric numeral 16 registers with the arrow 34. The cycler switches 15 and 16 will then close, the cycler switch 17 remaining open. The entire drying operation will then be under the control of the cycler switch 16 and the low temperature thermostat 36.

It should here be understood that the time of each cycling step may vary, dependent upon the moisture removed from the clothes and also dependent upon the load being dried. Thus the first cycling step may be relatively long, while each successive cycling step may be progressively shorter. The setting of the dial knob 33 may, therefore, be the same for a heavy load as for a light load, the drying time being entirely determined by the condition of the clothes, rather than by any set unit of time.

In cases where it may be desired to circulate air over the clothes, the dial knob 33 is turned to its air position. The switch 15 will then close, the switches 16 and 17 being open. The control is then carried out under manual control of the dial knob 33.

It may be seen from the foregoing that a simplified and improved control circuit has been provided for controlling the heating element of a clothes drier, in which drying is controlled entirely by the condition of the clothes, measured by the high temperature thermostat 35, and in which cooling and termination of the drying operation is controlled by the low temperature thermostat 36, which effects the advance of the cycler to the end of the cycle of operation thereof, as the low temperature thermostat closes.

It may further be seen that the usual timer, relay and heat selector switch previously used in the control of driers have been replaced by an impulse cycler, the number of impulses or cycles of which may be pre-set in accordance with the type of material to be dried, and that the time of operation of the cycler, or length of the drying steps, is entirely governed by the time required to remove moisture from the clothes to the extent sufficient to increase the temperature thereof to open the high temperature thermostat 175°.

It will be understood that various modifications and variations of the present invention may be effected without departing from the spirit and scope of the novel concepts thereof.

I claim as my invention:

1. In an automatic clothes drier having a heater unit, a motor effecting the tumbling of clothes and the circulation of heated air over the clothes, a high temperature thermostat and a low temperature thermostat, said high and low temperature thermostats being connected to said heater unit in parallel and controlling operation of said heater unit, an impulse cycler having a plurality of cam operated cyclic switches, electrically energizable actuating means for said cycler, energizable to effect step by step operation of said cycler, said cycler having a plurality of cams and cycling switches operated thereby, one cycling switch establishing an energizing circuit to said motor, the other cycling switches being connected in series with said high and low temperature thermostats and establishing individual energizing circuits through said high and low temperature thermostats to said heater unit, said cycler being settable for a preselected number of cycling steps in accordance with a selected fabric to be dried and completing an energizing circuit to said motor and to said heater unit through said thermostats upon the setting of said cycler to carry out a predetermined number of cycling steps, the high temperature thermostat being connected in series with said electrically energizable actuating means for said cycler and effecting the advance of said cycler and the energization of said heater unit each time said high temperature thermostat closes after having opened by a predetermined temperature rise of the clothes, the cycler switch in series with said high temperature thermostat establishing an energizing circuit to said high temperature thermostat, opening after a predetermined number of cycles of operation of said cycler, and said low temperature thermostat being connected in the energizing circuit to said heater through its associated cycling switch for the entire operation of said cycler and opening at lower temperatures than said high temperature thermostat and effecting the advance of said cycler to terminate the drying operation, upon the cooling of the clothes sufficiently to effect closing of said low temperature thermostat.

2. In a heater control circuit for clothes driers and the like, an impulse cycler, electrically energizable actuating means for said cycler, energizable to effect step by step operation of said cycler, a plurality of cycler switches operated by said cycler, a motor for effecting the tumbling of clothes and the circulation of heated air thereover, an energizing circuit through one of said cycler switches to said motor, a heater unit for heating the air circulated over the clothes, and means controlling operation of said heater unit in accordance with a predetermined temperature rise of the clothes comprising a high temperature thermostat and a low temperature thermostat, said thermostats having electrical connection with said heater unit in parallel for effecting the operation thereof, one cycler switch being in series with said high temperature thermostat and opening upon the advance of said cylinder a predetermined amount, the other cycler switch being connected in series with said low temperature thermostat and connecting said thermostat in the energizing circuit to said heater to the termination of operation of said impulse cycler, and said electrically energizable actuating means for said cycler being connected in series with said high and low temperature thermostats and being energized to operate said cycler upon the closing of said high temperature thermostat each time said thermostat closes by cooling of the clothes after having opened by a predetermined rise in temperature of the clothes for effecting a step by step advance of said cycler, and said low temperature thermostat effecting the energization of said electrically energizable means upon cooling of the clothes sufficiently to close said low temperature thermostat and upon the opening of the circuit through said high temperature thermostat by said cycler, and effecting the advance of said cycler to terminate the heating operation.

3. In a heater control circuit for clothes driers and the like, an impulse cycler, a plurality of cycler switches operated thereby, a motor for effecting the tumbling of clothes and the circulation of heated air over the clothes, an energizing circuit from a first of said cycler switches to said motor, a heater unit for heating the air circulated over the clothes, means controlling the operation of said heater unit comprising a high temperature thermostat and a low temperature thermostat, said high and low temperature thermostats being connected with said heater unit in parallel for effecting the operation thereof, a second cycler switch of said cycler switches being connected in series with said high temperature thermostat and establishing an energizing circuit to said heater unit through said high temperature thermostat, said cycler switch opening after a predetermined number of cycles of operation of said impulse cycler, a third cycler switch being connected in series with said low temperature thermostat and establishing an energizing circuit to said heater unit through said low temperature thermostat, said third cycler switch being closed throughout the cycle of operation of said impulse cycler, means operable by closing of said high temperature thermostat upon cooling of the clothes after the opening of said high temperature thermostat upon heating of the cloths to a predetermined temperature value for effecting a step by step advance of said cycler, and operable by closing of said low temperature thermostat upon the opening of said second cycler switch and the cooling of the clothes to a temperature sufficient to accommodate the closing of said low temperature thermostat to the termination of the drying operation, comprising a solenoid connected in series with each of said thermostats, and energized upon the closing of said thermostats to effect the advance of said cycler each time said heater unit is operated, and a dial knob for preselecting the cycling steps in accordance with the articles being dried and effecting the closing of said switches upon the preselection of a selected cycle.

References Cited in the file of this patent

UNITED STATES PATENTS

| 2,590,808 | Wagner | Mar. 25, 1952 |
| 2,621,423 | Clark | Dec. 16, 1952 |
| 2,769,246 | Shapter | Nov. 6, 1956 |
| 2,775,047 | Morrison | Dec. 25, 1956 |
| 2,797,497 | Engel et al. | July 2, 1957 |